(No Model.)
H. S. GLICK.
WHEEL.
No. 523,342.    Patented July 24, 1894.
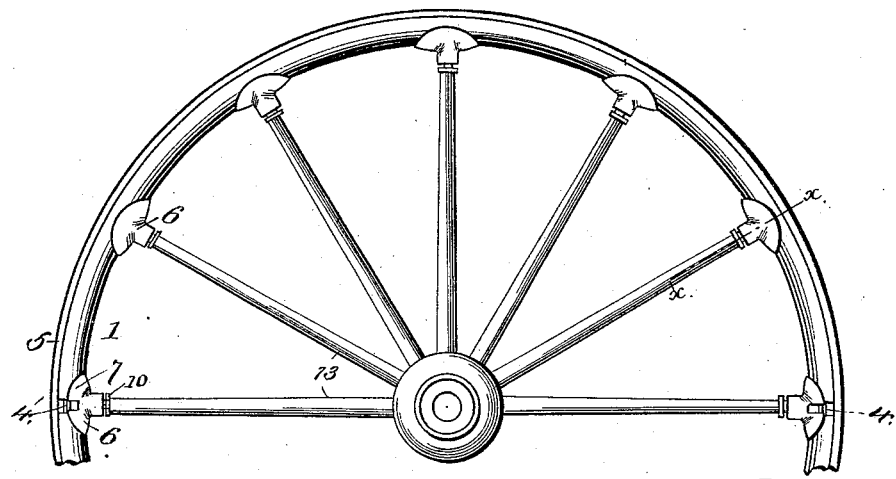
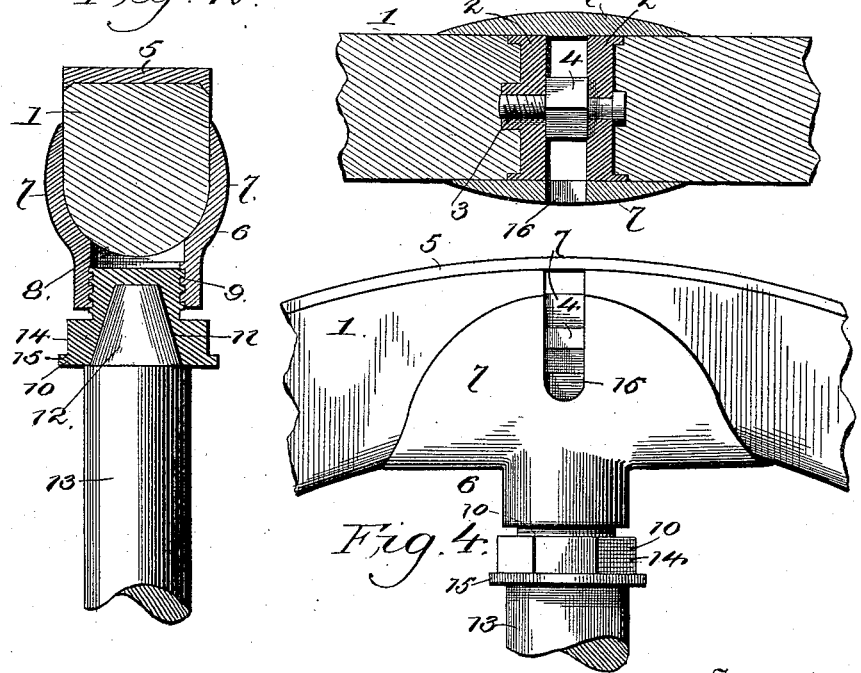
Witnesses
J. W. Reynolds
Chas. S. Hyer
Inventor
Henry S. Glick
by John Wedderburn
Attorney

UNITED STATES PATENT OFFICE.

HENRY S. GLICK, OF CASEY, ILLINOIS.

WHEEL.

SPECIFICATION forming part of Letters Patent No. 523,342, dated July 24, 1894.

Application filed November 1, 1893. Serial No. 489,741. (No model.)

*To all whom it may concern:*

Be it known that I, HENRY S. GLICK, a citizen of the United States, and a resident of Casey, in the county of Clarke and State of Illinois, have invented certain new and useful Improvements in Wheels; and I do hereby declare the following to be a full, clear, and exact description of the invention, such as will enable others skilled in the art to which it appertains to make and use the same.

This invention relates to improvements in wheels for all kinds of vehicles and has special reference to the arrangement of the spokes and felly.

The object of the invention is to provide simple and convenient means whereby the owner of a vehicle can set his own tires and thus save the ruining of his wheel by inefficient mechanics and at the same time to prevent the sagging of the felly or flattening of the joints, to take up expansion and contraction caused by a change in temperature and humidity of the atmosphere, and thereby avoid either a loose tire, a rim-bent wheel or an over dished wheel.

With this and other objects in view, the invention consists of the construction and arrangement of the several parts which will be more fully hereinafter described and claimed.

In the drawings:—Figure 1 is an elevation of a portion of a wheel embodying the invention. Fig. 2 is an enlarged sectional view on the line x—x, Fig. 1. Fig. 3 is an enlarged plan view of the joint between the ends of the felly. Fig. 4 is a side elevation of a spoke and socket, showing the socket cut away and shown adapted to be placed over and joined into the felly to permit the use of a wrench.

Similar numerals of reference are employed to indicate corresponding parts in the several views.

Referring to the drawings, the numeral 1 designates a felly which may be made of a single or several sections and in either construction the adjacent or meeting ends are provided with metallic ends 2, in which are seated the ends of the screw 3, having a central end 4. The one end of the screw 3 freely moves by a swivel arrangement of preferred form in one of the metallic ends 2, while the opposite portion of the screw is threaded and draws on the opposite metallic end and consequently tightens the felly. The tire 5, as shown in the enlarged section in Fig. 2 and which is known as the Sylvester tire is preferred to be used, as it does not require a single hole in the felly to fasten the same in position as will be readily seen. Secured to the inner side of the felly at proper intervals are sockets 6, provided with oppositely disposed flanges 7, which are intended to be constructed either of mild steel or good malleable iron, which embrace the felly and which snugly bend over the oppositely curved sides of the same in such a manner as to prevent the sockets from becoming disengaged. The inner portion of each socket is made tubular as at 8, and interiorly screw-threaded as at 9, which is adapted to receive a brass cap 10, with relative screw threads to engage the screw threads 9 and which is provided with a conical recess 11 to receive the conical shaped end 12 of the spoke 13. The cap in each instance, is formed with an outer flange 14 and a wrench engaging arm 15 of suitable shape. Thus it will be seen that instead of forming tenons on the ends of the spokes as is usually done, they are tapered in conical form and inserted in the cap as stated. The spokes are prevented from becoming disengaged, by adjusting the screw caps and holding said spokes between the said caps and the hub.

The spoke adjustment, as set forth, is especially useful on spokes which have become broken off at the felly.

In this application of the invention the tenon end of the spoke is sawed off for a short distance and then pointed conically with a suitable tool and by prying the felly upward slightly the conical pointed end of the broken spoke can be inserted in the conical opening of the cap and the flanges of the socket caused to embrace the felly. The flanges of the socket are afterward hammered against the felly, and in screwing the brass cap the spoke is clamped in rigid position and made fully as good, if not better than before it was broken.

In Fig. 4 the flanges of the socket are formed with aligned openings or sockets 16, which are adapted to fit over the point of the felly and permit a wrench to be inserted to engage the end 4.

It will be seen that the rim can be retained by unscrewing the bolt between the ends of the felly, thereby filling the tire when it becomes loose by summer heat or shrinkage of the wood of the same, and the spokes can be lengthened in a similar manner by unscrewing the brass cap, thus radially expanding the felly and tightening the tire to any desired degree, and by such operation a loose tire, a rim-bent wheel or an over-dished wheel is equally remedied and the strain on the tire, spokes and felly can be materially reduced. The construction of the device as herein set forth, allows the spoke to be placed on the joints of the felly, thus preventing the sagging of the felly or flattening of the joints, and in manufacture the wheels or fellies could be planed half round and made with but one joint if the timber could be so obtained, or there could be several joints so positioned that the spoke would come over the same and thereby make a much stronger and durable wheel. Except in the case of accident the tire on a wheel need never be removed until worn out, as the expansion and contraction of the same are under perfect control. The construction set forth also permits bent fellies to be used successfully on heavy wheels, which has been prevented heretofore by the small shoulder of the spoke pressing through the felly and splitting it.

By using the Sylvester tire which is fully set forth, there would be no need of a single hole in the felly and thereby dispense with the use of bolts entirely.

The attachment will add but little to either the weight or the cost of manufacture, and it will be obviously apparent that many minor changes within the scope of the invention might be made and substituted for those shown and described, without in the least departing from the nature and spirit of the invention.

Having thus described the invention, what is claimed as new is—

1. In a wheel, the combination of a felly having the ends thereof adjustably connected by a screw bolt supplied with a central nut, sockets applied to said felly at intervals with flanges which are adapted to embrace the opposite sides of the same and having adjustable screw caps therein provided with conical openings in their lower portions, and spokes having outer conical tapered ends to removably engage the said conical openings, the said sockets at the points where they cover the joints in the felly being secured by the insertion of a wrench, substantially as described.

2. In a wheel, the combination of a felly having a series of sockets applied thereto at intervals, provided with flanges adapted to embrace the same on opposite sides, and having adjustable screw caps provided with lower conical openings, and spokes having conical tapered ends removably engaging the said conical openings, substantially as described.

In testimony whereof I have signed this specification in the presence of two subscribing witnesses.

HENRY S. GLICK.

Witnesses:
M. W. BUCKLE,
JAMES C. KELLY.